(12) United States Patent
Berlin et al.

(10) Patent No.: US 7,033,455 B1
(45) Date of Patent: Apr. 25, 2006

(54) METHOD OF PRODUCING A LAMINATED PACKAGING MATERIAL

(75) Inventors: Mikael Berlin, Lund (SE); Mats Bentmar, Svedala (SE); Katarina Flemmer-Karlsson, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 200 days.

(21) Appl. No.: 10/070,167

(22) PCT Filed: Aug. 30, 2000

(86) PCT No.: PCT/SE00/01661

§ 371 (c)(1),
(2), (4) Date: Mar. 4, 2002

(87) PCT Pub. No.: WO01/17774

PCT Pub. Date: Mar. 15, 2001

(30) Foreign Application Priority Data

Sep. 7, 1999 (SE) .................................. 9903176

(51) Int. Cl.
  *B32B 31/14* (2006.01)
  *B65D 65/40* (2006.01)
(52) U.S. Cl. .............. 156/244.11; 156/307.5; 428/511; 428/513; 428/517; 428/533; 428/535; 428/521
(58) Field of Classification Search ........ 428/521, 428/533, 535, 517, 513, 511; 156/244.11, 156/307.5; 427/382
See application file for complete search history.

(56) References Cited

U.S. PATENT DOCUMENTS

| | | | | |
|---|---|---|---|---|
| 3,499,820 A | * | 3/1970 | Desaulniers | ................ 428/323 |
| 3,876,452 A | | 4/1975 | Anspon et al. | |
| 4,051,277 A | * | 9/1977 | Wilkinson et al. | .......... 427/288 |
| 5,506,011 A | * | 4/1996 | Farrell et al. | ............... 428/34.2 |
| 5,683,534 A | * | 11/1997 | Lofgren et al. | ............. 156/231 |
| 6,331,346 B1 | * | 12/2001 | Lu et al. | .................. 428/195.1 |
| 6,368,686 B1 | * | 4/2002 | Lofgren et al. | ............. 428/34.2 |
| 2001/0005550 A1 | * | 6/2001 | Bengtsson et al. | .......... 428/341 |

FOREIGN PATENT DOCUMENTS

| EP | 0590263 A2 * | 4/1994 |
|---|---|---|
| WO | WO 97/13639 | 4/1997 |
| WO | WO 97/22536 | 6/1997 |
| WO | WO 98/09812 | 3/1998 |
| WO | WO 99/46121 | 9/1999 |

\* cited by examiner

*Primary Examiner*—Sam Chuan Yao
*Assistant Examiner*—Barbara J Musser
(74) *Attorney, Agent, or Firm*—Buchanan Ingersoll PC

(57) ABSTRACT

The invention relates to a method of producing a laminated packaging material (10) including a core layer (16) of paper or paperboard and a barrier layer (14) applied on one side of the core layer. The invention also relates to a laminated packaging material (10) produced according to the method, as well as a packaging container (50) which is produced from the laminated packaging material (10).

19 Claims, 2 Drawing Sheets

US 7,033,455 B1

METHOD OF PRODUCING A LAMINATED PACKAGING MATERIAL

FIELD OF THE INVENTION

The present invention relates to a method of producing a laminated packaging material comprising a core layer of paper or paperboard and a barrier layer applied on one side of the core layer.

The present invention also relates to a laminated packaging material produced according to the method, as well as to packaging containers which are produced from the laminated packaging material. Particularly advantageous packaging laminates in which polyvinyl alcohol, preferably in combination with nanoparticles, is used as a barrier layer material are provided.

BACKGROUND OF THE INVENTION

It is well-known in the packaging industry to employ laminated packaging material of a single-use nature for packing and transporting liquid foods. Normally, such laminated packaging materials are built up from a configurationally rigid but foldable core layer consisting of, for example, paper or paperboard in order to achieve good mechanical configurational stability. Liquid-tight coatings of plastic are applied on both sides of the core layer and effectively protect the core layer of liquid-absorbing fibre from penetration by moisture. These outer layers normally consist of a thermoplastic, preferably polyethylene, which moreover impart to the packaging material superior thermosealing properties, whereby the packaging material may be converted into finished packages with the desired geometric configuration.

However, laminated packaging material consisting solely of paper or paperboard and liquid-tight plastic lacks tightness properties vis-6-vis gases, in particular oxygen gas. This is a major drawback in the packing of many foods whose shelf-life deteriorates dramatically when in contact with oxygen gas, such as for example fruitjuices. In order to supplement the packaging material with a barrier against gases, especially oxygen gas, it is known in the art to apply a layer possessing superior oxygen gas tightness properties, for example aluminum foil or polyvinyl alcohol, on that side of the core layer which is intended to face in towards the inside of the package.

In comparison with aluminum foil, polyvinyl alcohol enjoys many desirable properties, with the result that it is preferred as barrier material in many contexts.

In comparison with aluminium foil, polyvinyl alcohol enjoys many desirable properties, with the result that it is preferred as barrier material in many contexts. Among these, mention might be made of the polyvinyl alcohol's superior strength properties, compatibility with foods and economic value, together with its excellent oxygen gas barrier properties. Moreover, it has been considered to be expedient, in certain cases from the point of view the environment and recycling, to replace aluminum foil as the gas barrier material in food packages.

Like many other conceivable barrier or adhesive polymers such as, for example, ethylene vinyl alcohol, starch, starch derivative, carboxy methyl cellulose and other cellulose derivatives or mixtures thereof, polyvinyl alcohol is suitably applied by means of a coating process, i.e. in the form of a dispersion or aqueous solution which, on application, is spread out to a thin, uniform layer on the substrate and thereafter dried. We have found that one drawback in this process however is that an aqueous polymer dispersion or polymer solution of, for example, polyvinyl alcohol, optionally with an addition of EAA, which is applied on a core layer of paper or paperboard penetrates into the liquid-absorbing fibres of the core layer. In connection with the removal of water for drying and possibly for curing the applied barrier layer, the core layer is also subjected to elevated temperatures for drying, and as a result the risk of undesirable crack formation in the paperboard or paper layer, respectively, increases as a result of the result of the moisture content which is difficult to adjust, and the drying which takes place in this layer.

Swedish Patent No. 440519 proposed including a thickening agent such as alginate to reduce penetration of water into the board. The use of PVOH as a barrier material applied over a polymer layer preventing crack formation and smoothing the board surface was disclosed in WO97/13639.

One drawback is that the polyvinyl alcohol is moisture sensitive and rapidly loses its barrier properties when it is exposed to a damp environment. This inconvenience was previously obviated according to WO97/22536 by combining the polyvinyl alcohol with one or more per se known food-approved polymers, for example ethylene acrylic acid copolymer (EAA) or styrene butadiene copolymer. These advantageously form, in combination with polyvinyl alcohol, a coherent, well-integrated layer possessing superior gas barrier properties, in particular oxygen gas barrier properties, at the same time as the desired superior gas barrier properties of the polyvinyl alcohol are retained even in a damp environment.

WO97/22536 disclosed that polyvinylalcohol mixed with EAA-ethylene copolymer or the like material could be dispersion coated onto a paperboard previously coated with a polymer and thereafter could be dried and cured at temperatures of up to 170° C. to form a laminated packaging material with a very good barrier property and with good adhesion between the barrier layer and the substrate layer.

Without being restricted to any particular theory, it is suggested that the improved oxygen and water barrier properties results from an esterification reaction between the PVOH and the EAA at the increased curing temperature, whereby the PVOH is crosslinked by hydrophobic EAA polymer chains, which thereby are built into the structure of the PVOH.

Another drawback in the employment of, for example, polyvinyl alcohol as barrier layer instead of aluminum foil is that, on storage of light-sensitive foods, it is necessary in many cases also to incorporate into the packaging material a light barrier of some type. Granted, a core layer of paper or paperboard does not (to the naked eye) allow the passage of any light, but light in invisible wavelength ranges nevertheless penetrates through from the outside of a packaging container to the packed food product and may have a negative effect on it from the point of view of shelf-life. The employment of aluminum foil in the packaging material enjoys that advantage that the aluminum foil in itself constitutes a good barrier against both gases and against light. On the other hand, polyvinyl alcohol is as good as completely transparent even in mixtures with a hydrophobic polymer such as ethylene acrylic acid copolymer or styrene butadiene copolymer. The admixture of conventional light barriers, such as carbon black and titanium dioxide into any of the plastic layers included in the laminated packaging material according to WO97/22536 is per se possible, but would entail an aesthetically unattractive appearance in the package.

Yet a further drawback inherent in the laminated packaging material including barrier layers of, for example, polyvinyl alcohol possibly together with another polymer is that this packaging material cannot be produced employing the same production equipment as in the production of packaging material using aluminum foil as the barrier layer, which involves capital investment costs for new production equipment.

SUMMARY OF THE INVENTION

We have now found that a laminated packaging material possessing excellent barrier properties, in particular against gases, may be produced using a method which lends itself to being carried, out using conventional production equipment of the type employed in the production of packaging materials with aluminum foil as the barrier layer.

We have also now established that it is possible in a paperboard packaging laminate for liquid food packaging to obtain excellent high performance oxygen barrier properties from the use of a gas barrier composition including a dispersible or soluble polymer.

Furthermore, by avoiding coating the liquid gas barrier composition onto the core layer in connection with the lamination of the packaging material, we have eliminated the risk of excessive water absorption into the core layer and consequential crack formation when drying the coated core layer of paper or paperboard.

According to a first aspect of the invention, there is now provided a method of producing a laminated packaging material comprising a core layer of paper or paperboard and a barrier layer applied on one side of the core layer, characterised in that a liquid barrier composition including a dispersion or solution of a polymer is applied as a barrier layer on at least one side of a carrier layer and is dried during heating for driving off the dispersant or solvent at a first drying temperature in a first step, and that the carrier layer with the applied, dried barrier layer is combined and permanently united with one side of the core layer in a second step, whereafter the dried barrier layer is cured by heating to above a second temperature being higher than the first temperature, in a third step.

One great advantage by curing the barrier layer in a step after laminating the carrier layer bearing the dried barrier layer, to the core layer is that less heat energy is required, because the paperboard layer will act as a heat insulating layer when heating the surface of the uppermost barrier composition layer to the higher curing temperature. The heat may advantageously be supplied by means of a flame treatment to the barrier layer surface.

Another important advantage is that a film of heat sensitive plastics may be used as the carrier layer also—when curing of the dried barrier layer is to be carried out at temperatures above 130° C.

The carrier layer bearing at least one said barrier layer may preferably be combined and united with the core layer by extrusion of a layer of thermoplastics therebetween.

Where said carrier layer bears a said barrier layer on one side thereof it therefore may be combined with the core layer by extrusion of a layer of thermoplastics between the carrier layer and the core layer.

An outer layer of thermoplastics, preferably polyethylene, is then applied on the barrier layer by means of extrusion.

When the carrier layer bears a said barrier layer on one or both sides it may be combined with the core layer by extrusion of a layer of thermoplastics between the core layer and a said barrier layer.

If said carrier layer bears a said barrier layer on both sides thereof, a layer of thermoplastics may then be applied to the outer layer of barrier material by extrusion.

Preferably, the barrier layer is applied by means of liquid film coating with a liquid, preferably aqueous, composition including a dispersion or solution of a polymer. For example PVOH may be applied in the state of an aqueous solution.

The polymer preferably is a high hydrogen-bonding polymer having hydrogen-bonding groups or ionic groups to an extent of 20 weight % and above of the polymer molecule. More preferably, the polymer has functional hydroxyl groups and may for instance be selected from among polyvinyl alcohol (PVOH), ethylene vinyl alcohol (EVOH), polysaccharides such as starch, starch derivatives, carboxyl methyl cellulose and other cellulose derivatives, or a mixture of two or more thereof. Also polymers having nitrogen-containing groups may be employed. Most preferably, the polymer is a polymer having gas barrier properties itself, specifically polyvinylalcohol, starch or a starch derivative.

Said aqueous polymer dispersion or polymer solution applied as barrier layer may be dried at a first drying temperature of preferably approximately at least 80° C.

Most preferably, materials including PVOH and EAA are preferably first dried at web temperatures from 80 to 160° C. (preferably 140 to 160° C.) in a first step and are cured at web temperatures from 170 to 230° C., preferably from 170–190° C. in a second stage resulting in an improved gas barrier at 80% RH. According to the present invention, the carrier and barrier material is allowed to cool between the two steps.

A polymer with functional carboxylic acid groups may also be included. This may react with the polymer with functional hydroxy groups during the drying/curing process.

Suitably, the polymer with functional carboxylic acid groups is selected from among ethylene acrylic copolymer and ethylene methacrylic acid copolymers or mixtures thereof.

One preferred barrier layer mixture is of polyvinyl alcohol and ethylene acrylic acid copolymer (EAA). Another particularly preferred barrier layer mixture is of polyvinyl alcohol, EAA and an inorganic laminar compound. The EAA copolymer is preferably included in the barrier layer in an amount of about 1–20 weight %, based on dry coating weight.

Preferably, said inorganic laminar compound or so-called nanoparticle compound is dispersed to an exfoliated state, i.e. the lamellae of the layered inorganic compound are separated from each other by means of a liquid medium. Thus the layered compound preferably may be swollen or cloven by the polymer dispersion or solution, which at dispersion has penetrated the layered structure of the inorganic material. It may also be swollen by a solvent before added to the polymer solution or polymer dispersion. Thus, the inorganic laminar compound is dispersed to an exfoliated and delaminated state in the liquid gas barrier composition and in the dried barrier layer.

The term clay minerals includes minerals of the kaolinite, antigorite, smectite, vermiculite or mica type, respectively. Specifically, laponite, kaolinite, dickite, nacrite, halloysite, antigorite, chrysotile, pyrophyllite, montmorillonite, hectorite, sodium tetrasilicic mica, sodium taeniolite, commonmica, margarite, vermiculite, phlogopite, xanthophyllite and the like may be mentioned as suitable clay minerals.

The inorganic laminar compound or clay mineral preferably has an aspect ratio of 50–5000 and a particle size of up to about 5 um in the exfoliated state.

Preferably, the barrier layer includes from about 1 to about 40 weight %, more preferably from about 1 to about 30 weight % and most preferably from about 5 to about 20 weight %, of the inorganic laminar compound based on dry coating weight. If the amount is too low, the gas barrier properties of the coated and dried barrier layer will not be markedly improved compared to when no inorganic laminar compound is used. If the amount is too high, the liquid composition will become more difficult to apply as a coating and more difficult to handle in storage tanks and conduits of the applicator system.

Preferably, the barrier layer includes from about 99 to about 60 weight more preferably from about 99 to about 70 weight % and most preferably from about 95 to about 80 weight % of said polymer based on the dry coating weight.

An additive, such as a dispersion stabiliser or the like, may be included in the gas barrier composition, preferably in an amount of not more than about 1 weight % based on the dry coating.

Preferably, the barrier layer is cured at a temperature of up to 230° C. preferably approximately about 170° C. The high temperature curing may be of short duration, such as corresponding to web speeds normally used in the packaging laminate production.

The barrier layer is preferably applied on the carrier layer in an amount, depending on the kind of polymer, of approximately 0,5 to 20 $g/m^2$, more preferably approximately 1–10 $g/m^2$, based on dry weight. If the coated amount is too low, the gas barrier properties may be inferior, while if the amount is too high, there is a risk for an inflexible barrier layer and crack formation therein.

The carrier layer may consist of paper or plastics or plastics coated paper and preferred materials are described below. When paper is employed it is preferably thin. In one option the carrier layer preferably consists of paper with a grammage of approximately 5–35 $g/m^2$, e.g. 7–25 $g/m^2$, more preferably approx. 10–20 $g/m^2$. More preferably, the thin paper is coated by a thin layer of plastics, such as for example polyethylene.

The layer of plastics applied between the core layer and the carrier layer or a said barrier layer may include a substance functioning as light barrier. This is especially preferred when the carrier layer is of paper or other visually nontransparent material.

According to a second aspect of the invention, a laminated packaging material is provided, which is produced according to the above method of the invention.

According to a third aspect of the invention, a packaging container is produced by fold formation of a sheet or web-shaped laminated packaging material obtained by the above method according to the invention.

By applying, in a separate production stage, a liquid barrier composition including a polymer dispersion or polymer solution, and preferably further including an inorganic laminar compound, as a barrier layer on at least one side of a carrier layer and drying the barrier layer during heating for driving off water, and thereafter combining and permanently uniting the carrier layer with the applied, dried barrier layer to one side of the core layer and thereafter curing the dried barrier layer, there will be realised a laminate packaging material with a barrier layer possessing superior high performance oxygen barrier properties.

Thanks to the fact that the barrier layer is not dried at elevated temperature in connection with the lamination of the packaging material, the risk of excessive water absorption into the core layer and of drying of the core layer of paper or paperboard—with consequential risk of crack formation in the core layer—is wholly eliminated.

Given that the plastics layer applied between the core layer and a paper carrier layer may include a substance serving as light barrier, ideally carbon black, a light barrier layer will be realised whose unattractive black appearance may be concealed in a layer between the core layer and a thin paper layer carrying the barrier layer.

One important advantage of the method according to the aspect of the present invention is that the barrier layer produced in a separate stage may be employed in the production of a laminated packaging material in a corresponding manner and using corresponding production equipment as are employed today in the production of packaging materials with aluminum foil as the oxygen gas barrier.

Another important advantage of the method according to the present invention, wherein the curing of the barrier layer polymer at a higher curing temperature is carried out in a separate step after having laminated the carrier layer bearing the dried barrier layer to the core layer, is that also heat sensitive carrier layers such as thin thermoplastic films, for example of low density polyethylene (LDPE), may be used without risk of the film melting, shrinking, expanding or in other ways changing dimensions. Furthermore, less heat energy is required for reaching the curing temperature of the web surface thanks to the heat insulating effect of the paperboard core layer in the heated web.

BRIEF DESCRIPTION OF THE DRAWINGS

The present invention will now be described in greater detail herein below, with the aid of non-restrictive examples of methods, as well as packaging laminates obtainable by the method, according to preferred embodiments of the present invention and with reference to the accompanying drawings, in which.

DETAILED DESCRIPTION OF THE INVENTION

Figure 1:
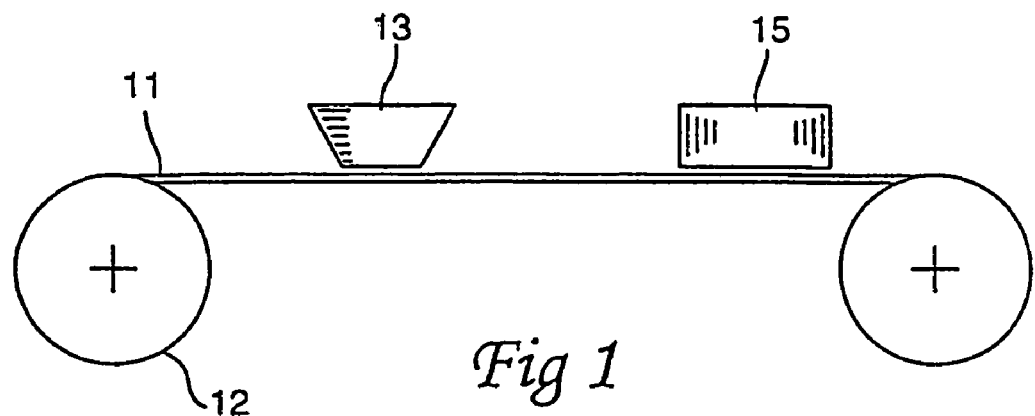
FIG. 1 schematically illustrates a method of producing a carrier layer with a barrier layer according to the present invention applied thereon.
Figure 2:
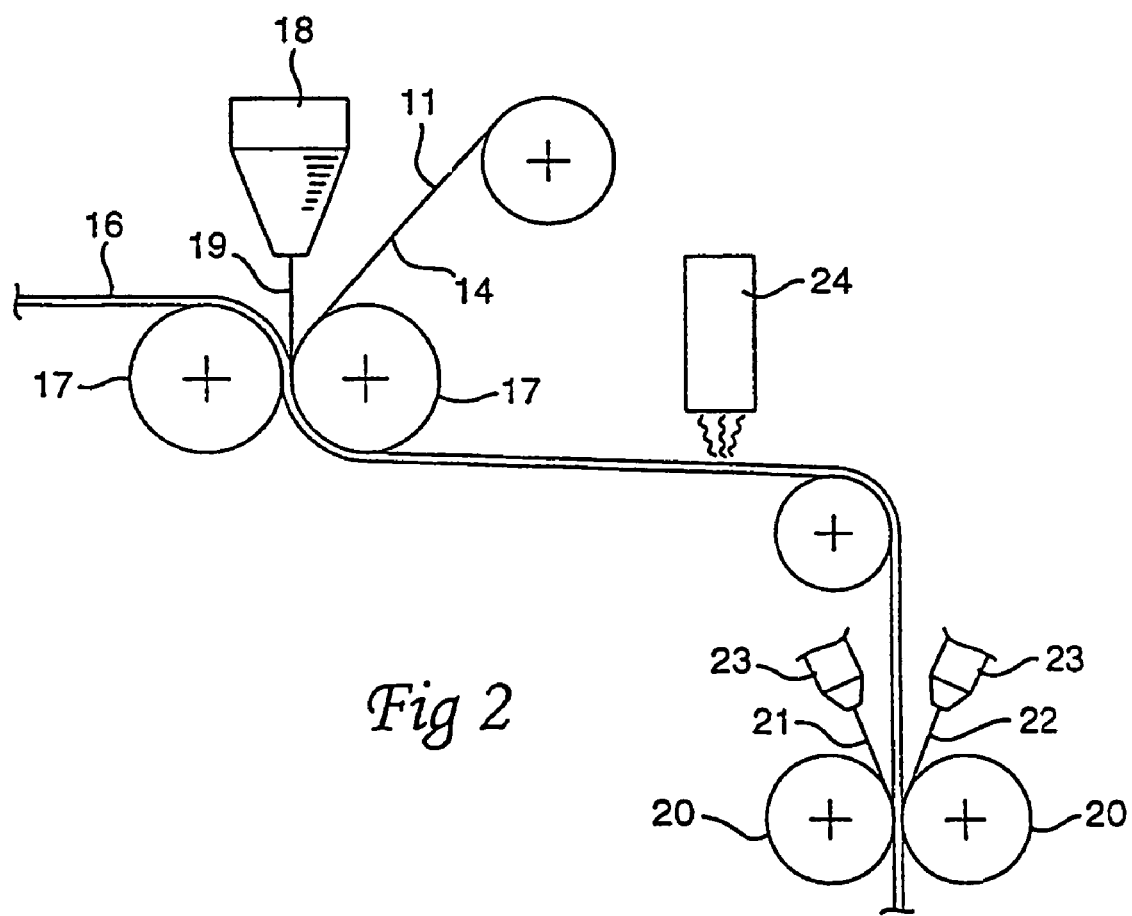
FIG. 2 schematically illustrates a method of producing the laminated packaging material according to the present invention.
Figure 3:
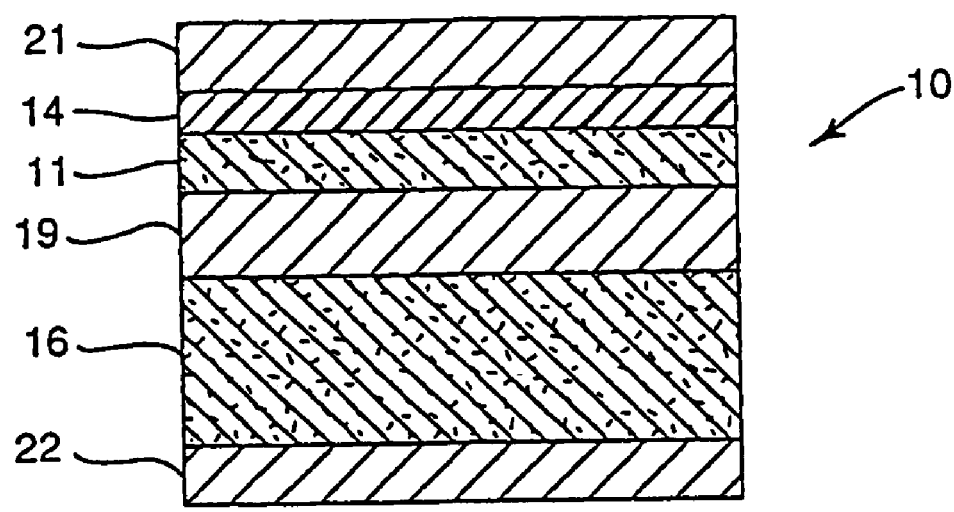
FIG. 3 is a cross sectional view through a laminated packaging material according to the present invention.

Referring to the Drawings, FIGS. 1 and 2 schematically illustrate a method according to the present invention chosen by way of example for producing a laminated packaging material 10 shown in FIG. 3. A web of a carrier layer 11, for example of thin paper, which may preferably be coated with a thin layer of plastics, is unwound from a magazine reel 12 and led past an applicator 13 (ideally a liquid film coating apparatus) disposed adjacent the web, by means of which at least one barrier layer 14 of an aqueous composition comprising a dispersion or solution of a polymer and an inorganic laminar compound is applied on the one side of the carrier layer 11 in the form of a substantially cohesive barrier layer 14. In the case of a plastics coated paper carrier layer, the polymer dispersion or solution is preferably applied to the plastics coated side. The quantity of applied solution may vary, but is preferably in such an amount that a thoroughly integrated and substantially unbroken layer is formed after drying, for example approx. 0.5–20 g/m$^2$, preferably 1–10 g/m$^2$, based on dry weight.

Where a composition including PVOH, and preferably also inorganic laminar compound, is used, the carrier layer 11 preferably consists of a layer of thin paper with a grammage of approx. 5–35 g/m$^2$, preferably 7–25 g/m$^2$, more preferably 10–20 g/m$^2$ or such a plastics coated paper layer, but may also be a plastics film. However, thin paper enjoys the advantage that it is not sensitive to temperature increases in connection with drying, as may be the case with plastic films.

The barrier layer 14 is applied on the carrier layer 11 in the form of an aqueous composition, comprising a polymer dispersion or polymer solution and preferably an inorganic laminar compound, the composition including a polymer with those properties which are desired to be added to the packaging laminate in the form of a coated layer, for example a polymer with functional hydroxyl groups, for instance polyvinyl alcohol, ethylene vinyl alcohol, starch, starch derivative, carboxy methyl cellulose and other cellulose derivates or mixtures thereof.

The barrier layer 14 may also include a hydrophobic polymer as described in WO97/22536, for example a styrene butadiene copolymer.

The barrier layer 14 may also include a polymer with functional groups which are reactive with the functional hydroxyl groups in the above-mentioned polymer, for realising a cross-linked barrier layer 14. Such polymers may be polyolefins modified with carboxyl acid groups or graft copolymers with monomers containing carboxyl acid groups in an olefin homo- or copolymer. Alternatively, such polymers may be random selected copolymers of olefin monomers and monomers containing functional carboxylic acid groups, such as carboxylic acids, carboxylic acid anhydrides, metal salts of carboxylic acids or derivates thereof. Specific examples of suitable functional polyolefins include polyethylene and polypropylene homo- or copolymers grafted with maleic acid anhydride, ethylene acrylic acid (EAA) or ethylene metacrylic acid (EMAA), or random selected copolymers.

It is particularly preferred that the barrier layer 14 includes a mixture of polyvinyl alcohol and ethylene acrylic acid copolymer or a mixture of polyvinyl alcohol, EAA and an inorganic laminar compound. The mixing ratio between polyvinyl alcohol and ethylene acrylic acid copolymer in the barrier layer 14 should be such that the polyvinyl alcohol may form a blanket protection against gas transport in the packaging laminate, at the same time as the quantity of ethylene acrylic acid copolymer should be sufficient to form a cohesive phase which partly protects the polyvinyl alcohol and partly effectively counteracts or prevents the transport of liquid through the polymer of the barrier layer 14.

The aqueous composition is preferably applied by means of liquid film coating technology, also called "dispersion coating" or "wet coating", which is well known in the prior art of coating of aqueous solutions and dispersions, but also other coating methods are feasible according to the invention, depending on the viscosity of the composition.

The web of carrier layer 11 is led, after coating, further past a drying apparatus 15, e.g. an IR drier or a hot air drier which acts on the coated side of the carrier layer 11 for driving off water and drying the applied barrier layer 14 at a web surface temperature of approx. 80–150° C.

Finally, the finished carrier layer 11 with the applied barrier layer 14 is rolled up and may subsequently be stored or employed direct in a conventional lamination process for the production of a laminated packaging material 10 possessing superior barrier properties.

The carrier layer 11 with the applied barrier layer 14 may ideally be employed for the production of packaging material 10 in a corresponding manner and using corresponding production equipment to that employed in the production of packaging material with aluminum foil as the barrier layer. FIG. 2 shows a web of a configurationally rigid but foldable core layer with a grammage of approx. 100–500 g/m$^2$, preferably approx. 200–300 g/m$^2$, which may be a conventional fibre layer of paper or paperboard of suitable packaging qualities. The core layer 16 is led through the nip between two rotating rollers 17 and is united with a web of carrier layer 11 with dried or cured barrier layer 14, during the application employing an extruder 18 of one or more layers of extrudable thermoplastic 19, preferably polyethylene, between the core layer 16 and the carrier layer 11. As shown, the barrier material 14—is preferably on the outer face of the carrier layer.

The web is subsequently forwarded to a curing station 24 where the web bearing said outermost barrier layer 14 is subjected to heat such that the surface temperature is raised to approximately 170° C. or above. Any heat source may be employed, but preferably the heat is supplied to the web surface by a flame, known as such in the art. The heat curing treatment is of short duration while the web is forwarded at normal web speed for packaging laminate production.

The thus laminated web is finally led through the nip between two rotating rollers 20 under the simultaneous application of thin layers 21, 22 of extrudable thermoplastics, preferably polyethylene, against both outer sides of the web employing extruders 23, the finished laminated packaging material 10 according to the present invention obtaining the cross-section-al structure schematically shown in FIG. 3. Alternatively, two extruders 23 may be disposed in sequence for the consecutive extrusion of thin layers 21 and 22 of thermoplastic on the respective outer sides of the laminated web.

The two plastics layers 21 and 22 have for their purpose, on the one hand, to protect the packaging material 10 from the penetration of moisture and damp from the outside and, also the crucial function of rendering the packaging material sealable by conventional so-called thermosealing, whereby mutually facing layers of plastic may be joined together under the supply of heat and pressure by surface fusion. The thermosealing operation realises mechanically strong, liquid-tight sealing joints during the conversion of the packaging material into finished packaging containers.

The outer plastics layer 22 which is applied on the packaging material 10 on that side of the core layer 16 which, in the finished packaging container, is intended to be turned to face towards the outside may be provided with a suitable print of a decorative and/or informative nature for identifying a packed product.

Figure 4:
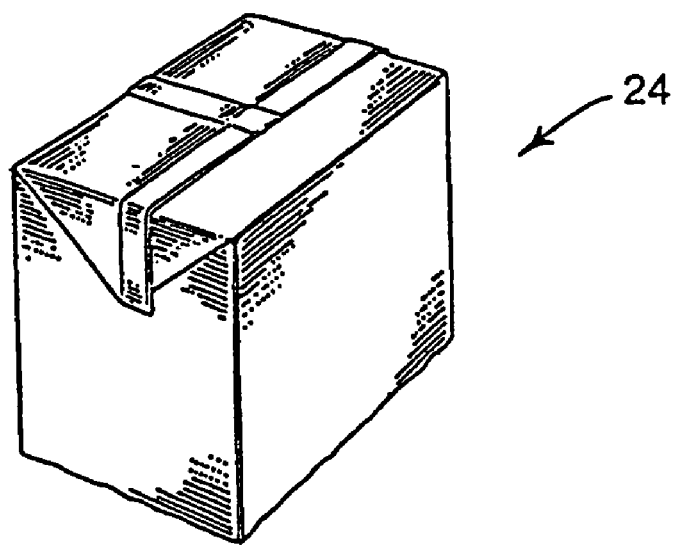
FIG. 4 is a perspective view from above of a conventional, configurationally stable packaging container which is produced from a laminated packaging material according to the present invention.

From the laminated packaging material according to the present invention, liquid-tight, dimensionally stable packages possessing superior oxygen gas barrier properties may be produced employing known packaging and filling machines which, in a continuous process, form, fill and seal the material into finished packages 50. An example of such a conventional, packaging container 50 is shown in FIG. 4.

By first uniting the longitudinal edges of a web-shaped laminated packaging material 10 into a tube which is filled with the contemplated contents, whereafter individual packages 50 are separated from the web by repeated transverse sealing of the tube below the level of the contents. The packages 50 are separated from one another by incisions in the transverse sealing zones and obtain the desired geometric configuration, normally parallelepipedic, by a final fold formation and sealing operation.

Thus a further important advantage by a preferred embodiment of the method illustrated, is that the steps of application and drying of the liquid gas barrier composition may be performed off the lamination processing line, thus avoiding costly modifications and re-construction of the lamination equipment in the manufacturing of packaging laminates having a core layer. By applying the barrier layer on to a thin carrier layer such as a plastics film or a thin paper having a smooth, essentially non-absorbing surface, in the sub-sequence lamination with further layers of plastics and a core layer, the lamination operation may be performed using the same equipment and process as is used today, when laminating for example aluminum foil and inside layers.

The method of curing the barrier layer at an elevated temperature in a step after laminating the carrier with the barrier layer to the core layer is particularly advantageous, because the carrier layer in this case does not have to be dimensionally heat resistant and because less heat energy is required for reaching the curing temperature. When curing the barrier layer merely applied onto the thin carrier layer, the heat energy rapidly dissipates through the thin carrier layer out of the web and it therefore takes longer time to reach the required web surface curing temperature.

From sheet or web-shaped, preferably pre-creased and colour decorated, blanks of the packaging laminate 10, liquid-tight, preferably dimensionally stable packages of the single-use disposable type are produced in accordance with conventional form-fill-seal technology, according to which the packages are formed, filled and sealed by means of modern, rational packaging and filling machines. From, for example, a web of the packaging laminate, such packages are produced in that the web is first reformed into a tube, by both longitudinal edges of the tube being united with another by heat sealing in a longitudinal overlap joint seal. The tube is filled with the pertinent contents, for example liquid food, and is divided into individual packages by repeated transverse sealings of the tube, transversely across the longitudinal axis of the tube, beneath the level of the contents in the tube. The packages are finally separated from one another by transverse incisions along the transverse seals, thus forming pillow-shaped sealed packages. The pillow-shaped packages may be distributed as such or first given a desired geometric, normally parallelepipedic form by an additional forming and heat-sealing operation in a per se known manner.

It should be noted that the various packaging laminates according to the invention may comprise a multiple number of layers in addition to those shown in the drawings. It will thus be obvious to a person skilled in the art that the number of layers may vary and that the description of the illustrated embodiments should not, therefore, be considered as restrictive of the present invention.

PREPARATION EXAMPLE I

An aqueous dispersion of from about 1–5 weight % exfoliated flake-shaped mineral particles (natural, e.g. Montmorillonite, or synthetic, e.g. Laponite) having an aspect ratio of about 50–5000, is blended with an aqueous solution of about 530 weight % of PVOH (having a molecular weight of 16000–200000 g/mol and a saponification degree of 95–100%) at 60–90° C. during 2–8 hours. The dispersion of exfoliated laminar mineral particles may be stabilised by means of a stabiliser additive. Alternatively, the laminar mineral particles are exfoliated in the PVOH solution at 60–90° C. during 2–8 hours. Aqueous ethylene acrylic acid copolymer dispersion is added to the aqueous mixture of PVOH and mineral patches. The resulting mixture is dispersion coated by from about 1 to about 10 g/m2 based on dry coating weight onto a thin plastic coated paper carrier layer. The wet coating is applied as a solution/dispersion in water and dried at a web surface temperature of 100–150° C. The carrier layer bearing the dried barrier layer was extrusion laminated to the core layer and subsequently exposed to a web surface temperature of 170–190° C. for curing of the barrier layer.

What is claimed is:

1. A method of producing a laminated packaging material for liquid food packaging comprising a core layer of paper or paperboard and a gas barrier layer applied on one side of the core layer, wherein a liquid barrier composition including a dispersion or solution of a polymer is applied as the barrier layer on at least a first side of a carrier layer and is dried during heating for driving off liquid at a first drying temperature in a first step, and that a second side of the carrier layer is combined and permanently united with one side or the core layer in a second step, whereafter the dried barrier layer is cured by heating to above a second temperature being higher than the first temperature, in a third step, and wherein outer layers of thermoplastics, are applied on the barrier layer and the core layer by means of extrusion in a fourth step, and wherein the steps occur sequentially.

2. The method as claimed in claim 1, wherein the carrier layer bearing at least one dried barrier layer is combined and united with the core layer by extrusion of a layer of thermoplastics therebetween.

3. The method as claimed in claim 1, wherein said barrier layer is applied on the carrier layer by means of liquid film coating with said liquid barrier composition.

4. The method as claimed in claim 1, wherein said liquid barrier composition applied as a barrier layer includes a polymer with functional hydroxyl groups.

5. The method as claimed in claim 4, wherein said polymer with functional hydroxyl groups is selected from the group consisting of polyvinyl alcohol, ethylene vinyl alcohol, starch, starch derivatives, carboxyl methyl cellulose and other cellulose derivatives, and a mixture of two or more thereof.

6. The method as claimed in claim 1, wherein said liquid barrier composition applied as the barrier layer is dried at a web surface temperature of approx. 80 to 160° C.

7. The method as claimed in claim 1, wherein said liquid barrier composition applied as the barrier layer also includes a polymer with functional carboxylic acid groups.

8. The method as claimed in claim 7, wherein said polymer with functional carboxylic acid groups is selected from the group consisting of ethylene acrylic acid copolymer and ethylene metacrylic acid copolymer and mixtures thereof.

9. The method as claimed in claim 8, wherein said barrier layer is a mixture of polyvinyl alcohol and ethylene acrylic acid copolymer.

10. The method as claimed in claim 8, wherein said barrier layer is a mixture of polyvinyl alcohol, ethylene acrylic acid copolymer and an inorganic a laminar compound.

11. The method as claimed in claim 7, wherein the dried barrier layer is cured at a temperature of up to 200° C.

12. The method as claimed in claim 1, wherein said barrier layer is applied on the carrier layer in an amount of approx. 1–10 g/m$^2$, based on dry coating weight.

13. The method as claimed in claim 1, wherein said carrier layer consists of thin paper optionally coated with a layer of plastics or of a plastics film.

14. The method as claimed in claim 1, wherein said carrier layer consists of paper with a grammage of approx. 5–35 g/m$^2$.

15. The method as claimed in claim 2, wherein the layer of plastic applied between the core layer and the carrier layer includes a substance functioning as light barrier.

16. The method as claimed in claim 11, wherein the dried barrier layer is cured at a temperature of approx. 170 to 190° C.

17. The method as claimed in claim 1, wherein the outer layers of thermoplastics include polyethylene.

18. A method of producing a laminated packaging material for liquid food packaging comprising a core layer of paper or paperboard and a gas barrier layer applied on one side of the core layer, the method comprising the following steps in order:

applying a liquid barrier composition including a dispersion or solution of a polymer as a barrier layer on a first side of a carrier layer, wherein applying occurs in a barrier layer and carrier layer production line;

driving off liquid from said barrier layer by heating to a first temperature to produce a dried barrier layer on the carrier layer, wherein driving off liquid occurs in the barrier layer and carrier layer production line;

winding the dried barrier layer on the carrier layer on a roll;

unwinding the roll and introducing said dried barrier layer on the carrier layer into a lamination processing line;

combining and permanently uniting a second side of the carrier layer with one side of a core layer by extrusion of a layer of thermoplastics therebetween, wherein combining and permanently uniting occurs in the lamination processing line;

curing the dried barrier layer to form an intermediate web by heating to above a second temperature, wherein the second temperature is greater than the first temperature and curing occurs in the lamination processing line; and applying a first outer layer to a first side of the intermediate web and applying a second outer layer to a second side of the intermediate web, therein both the first layer and the second layer are thermoplastics and the first layer and the second layer are applied by extrusion.

19. The method of claim 18, wherein the carrier layer is heat sensitive at temperatures above the second temperature.

* * * * *